(12) United States Patent
Yeh et al.

(10) Patent No.: US 9,183,329 B2
(45) Date of Patent: Nov. 10, 2015

(54) DEBUGGING SIMULATION WITH PARTIAL DESIGN REPLAY

(75) Inventors: Nan-Ting Yeh, Hsinchu (TW); Wenchu Cheng, Hsinchu (TW); Kuen-Yang Tsai, Jhudong Township (TW); Chia-Ling Ho, Ruifang Town (TW)

(73) Assignee: Synopsys, Inc., Mountain View, CA (US)

( * ) Notice: Subject to any disclaimer, the term of this patent is extended or adjusted under 35 U.S.C. 154(b) by 1273 days.

(21) Appl. No.: 12/407,169

(22) Filed: Mar. 19, 2009

(65) Prior Publication Data

US 2010/0241414 A1 Sep. 23, 2010

(51) Int. Cl.
*G06F 17/50* (2006.01)
*G06F 9/455* (2006.01)

(52) U.S. Cl.
CPC ........ *G06F 17/5022* (2013.01); *G06F 17/5009* (2013.01); *G06F 17/5036* (2013.01); *G06F 17/5045* (2013.01)

(58) Field of Classification Search
CPC ............ G06F 17/5022; G06F 17/5036; G06F 17/5009; G06F 17/5027; G06F 17/5045
USPC ...................................... 703/14, 26
See application file for complete search history.

(56) References Cited

U.S. PATENT DOCUMENTS

| | | | |
|---|---|---|---|
| 6,226,777 B1 * | 5/2001 | Zhang ........................... 716/104 |
| 6,618,837 B1 * | 9/2003 | Zhang et al. ................... 716/111 |
| 7,085,700 B2 * | 8/2006 | O'Riordan et al. ............. 703/14 |
| 7,480,606 B2 * | 1/2009 | Tseng et al. .................... 703/14 |
| 7,979,833 B2 * | 7/2011 | Mohiuddin et al. .......... 716/136 |
| 2006/0074622 A1 * | 4/2006 | Scott et al. ...................... 703/23 |
| 2006/0101309 A1 * | 5/2006 | Mohiuddin et al. ............ 714/33 |
| 2008/0270103 A1 * | 10/2008 | Kaszynski et al. ............. 703/22 |
| 2009/0320009 A1 * | 12/2009 | Chow et al. ................... 717/154 |
| 2009/0320011 A1 * | 12/2009 | Chow et al. ................... 717/154 |
| 2010/0241414 A1 * | 9/2010 | Yeh et al. ........................ 703/14 |

OTHER PUBLICATIONS

Daniel Neri, "Debugging distributed applications with replay capabilities", 2007.*
Smruti R. Sarangi, "CADRE: Cycle-Accurate Deterministic Replay for Hardware Debugging", IEEE 2006.*

* cited by examiner

*Primary Examiner* — Saif Alhija
*Assistant Examiner* — Angel Calle
(74) *Attorney, Agent, or Firm* — Alston & Bird LLP

(57) ABSTRACT

A virtual platform simulates behavior of a modular circuit based on a circuit design including both high-level and low-level models of circuit modules. A compiler that converts the high-level and low-level models into executable models prior to an initial simulation also generates a separate "replay engine" corresponding to each low-level module for use during subsequent replay simulations. During the initial simulation, the virtual platform simulates circuit behavior by concurrently executing the high-level and low-level executable models and recording data representing behavior of output signals of the low-level design modules modeled by the executable models. To speed up subsequent replays of the simulation, the virtual platform executes one or more of the replay engines in lieu of executing their corresponding low-level executable models. Each executed replay engine simulates behavior of each output signal of a corresponding low-level module in response to the data recorded during the initial simulation representing the behavior of that output signal.

20 Claims, 6 Drawing Sheets

DEBUGGING SIMULATION WITH PARTIAL DESIGN REPLAY

BACKGROUND OF THE INVENTION

1. Field of the Invention

The present invention generally relates to logic simulation of electronic systems, and more particularly to a system for debugging a heterogeneous design in a co-emulation or co-simulation environment.

2. Description of Related Art

An IC design typically organizes the logic blocks of an integrated circuit (IC) into a set of modules that communicate with each other, and at various stages of the development process an IC design models the modules at varying levels of abstraction. A logic simulator running on a computer workstation compiles a circuit design into executable code and then executes that code to simulate the behavior of the circuit in response to a user-defined pattern of input signals. During the simulation, the logic simulator saves data representing the succession of state changes of various signals of the IC in a value change dump (VCD) file. A user can then employ a debugger accessing the VCD file to debug the circuit design based on the simulated signal behavior.

Since saving data representing the behavior of every signal of a simulated circuit in a VCD file takes too much time, a user will normally program the logic simulator to save data representing behavior of only a selected subset of the circuit's signals such as, for example, the input and output signals of each module. If the user determines during debugging that a particular module of interest has a design defect and wants to know how the internal signals of that module behaved during the simulation, the user can rerun the simulation, telling the logic simulator to save data representing the behavior of those internal signals. Since the module of interest receives signals from other modules, it is necessary to re-run the simulation of the entire circuit, not just the module of interest. Thus a replay simulation can require as much processing time as the original simulation.

One way to reduce processing time for a replay simulation is to replace the slow executing models of various circuit modules with a fast executing script that simply reproduces the input signals to the module of interest. As illustrated in FIG. 1, Synopsys Inc. markets a Verilog Compiled Logic Simulator ("VCS") including a utility 'vcat' 10 for generating Verilog and very high-level design language (VHDL) scripts 12 from a value change dump VCD file 14. When the logic simulator saves the value changes of input signals and output signals of a simulated circuit module, the vcat utility 10 can convert those saved values to executable high-level language (HDL) code (a "script") 12, that the logic simulator can execute in lieu of the original code of the module during simulation re-runs if all the conditions stay the same during the re-runs. A configuration file (vgen.cfg) 12 contains a module header and port declarations (a module interface definition), an indication as to whether testbench generation or module generation is to be performed and the hierarchical name of the module instance. Thus if the user is interested in investigating internal behavior of a particular module of a simulated circuit, the user can run a re-simulation of a particular module more quickly by using vcat output scripts to represent other portions of the simulated circuit.

Depending on usage, vcat can generate a testbench for a specified module instance, or to generate a module to mimic the behavior of a specified module instance. In the first approach, value changes of the input signals to a module instance are computed by the generated HDL code and used to drive those input signals during subsequent simulations. In the second approach, value changes of output signals of a module instance are computed by the generated HDL code and used to drive those output signals during subsequent simulations. The first approach ("test bench generation") allows the user to preserve the code of the designated module of interest while replacing the rest of the system with the generated HDL code. The second approach ("module generation") allows the user to replace a designated module instance with the generated HDL code and preserve the rest of the system. The test bench or module generation supports only modules that do not have bi-directional "inout" ports.

A Carbon Design Systems, Inc. tool "Model Studio" can compile register transfer level (RTL) code into high-speed software models. Another Carbon Design Systems, Inc tool provides a "Replay Plug-In" for accelerating the runtime speed of a virtual platform and enabling interactive software debugging that runs on the virtual platform. These "carbonized" high-speed software models save value changes in a file during the first simulation run. On subsequent runs, the carbonized modules use the values saved in the file as long as the input values provided as stimulus to those models remain unchanged from the first simulation run. The carbonized models are capable of detecting differences in stimulus, and automatically switching to actually evaluating the model in full when necessary to generate the correct outputs. During the first simulation, when software is executing on Carbon Models, the Carbon Models record incoming bus traffic and responses and save the models' state information periodically at "checkpoints". In subsequent iterations, the Carbon Models replay their saved responses to the system at very high-speed. The replay system monitors the model stimulus and detects any differences from previous runs. If there is a change, a full Carbon Model is substituted for the Replay Model guaranteeing that the simulation can execute new code paths with the hardware's true behavior. The high-performance Replay Model enables interactive software debugging, while maintaining hardware accuracy.

A circuit design can incorporate pre-designed "core" modules into an IC design. Referring to FIG. 2, U.S. publication number 20060101309 filed May 11, 2006 by Mohiuddin et al. teaches that when a circuit designer wants to incorporate a core described in RTL code into a circuit containing other modules, the core designer provides an encrypted version 106 of the RTL code within a simulation environment 100 while the circuit designer provides models for the other circuit modules 108. When the circuit designer runs a simulation of encrypted core 106, he cannot inspect the internal functioning of the encrypted core 106 to determine why the encrypted core may not have behaved as expected. The circuit designer therefore cannot debug the overall design with respect to the functions of the encrypted core 106 without assistance of the core designer, since only the core designer can examine the interior behavior of the unencrypted core 104. To avoid having to disclose details of the other modules 108 to the core designer, the circuit designer can use a pattern recorder 110 (a simulation tool or utility) within simulation environment 100 to record input stimuli provide by the other modules 108 to encrypted core 106 through an input/output (I/O) wrapper 114, an HDL module that defines the I/Os of the encrypted core 106 and allows the core designer to view the top-level I/Os of the encrypted core 106.

Pattern recorder 110 also records output results generated by the encrypted core 106 due to the input stimuli. A record clock 136 clocks sampling and recording of the input stimuli 112, a check clock 138 clocks sampling and recording of the output 116, and a system clock 140 clocks modules 108 and encrypted core 106. The recorded input stimuli are saved within a flag file 118 and an input pattern file 120, and the recorded output results are represented within the output pattern file 122. The circuit designer provides files 118,120 and 122 to the core designer to assist in the troubleshooting or debugging of the circuit design with respect to the functions of encrypted core 106 in another simulation environment 102 employed by core designer.

The core designer's simulation environment 102 includes a pattern player 124, a pattern checker 126 (additional simulation tools or utilities), and the unencrypted core 104. The pattern player 124 receives the flag file 118 and the input pattern file 120. With these files 118 and 120, the pattern player 124 generally recreates the input stimuli 112 (recreated input stimuli 128) during simulation within the company's simulation environment 102. The pattern player 124 supplies the recreated input stimuli 128 to the core 104. The core 104 generates output results (output 130) in response to the recreated input stimuli 128. Pattern checker 126 compares output 130 with output pattern file 122 to find any mismatches 132 between the output results from the two simulation environments 100 and 102. Any such mismatches 132 are presented to a user of the company's simulation environment 102 to investigate the cause of the mismatch. Additionally, the pattern checker 126 supplies waveforms of the output 130 and the output pattern file 122 to any appropriate waveform viewer 134.

SUMMARY OF THE INVENTION

The invention relates to a method for employing a virtual platform to simulate and re-simulate behavior of a modular circuit described by a circuit design including both high-level design models and low-level design models to describe various modules of the circuit.

Prior to an initial simulation, each high-level design model is compiled into a corresponding high-level executable model for simulating behavior of a corresponding one of the circuit modules and each low-level design model is compiled into a corresponding low-level executable model for simulating behavior of a corresponding one of the low-level circuit modules. At the same time, each low-level design model is compiled into a corresponding "replay engine" for simulating behavior of a corresponding circuit module during replay simulations.

During the initial simulation, the virtual platform simulates circuit behavior by concurrently executing the high-level and low-level executable models and recording data representing behavior of input signals and output signals of the low-level design modules modeled by the executable models. The high-level executable models are implemented as software models executed by a workstation. Each low-level executable model may be implemented either as a software executable model implemented by the workstation or as a hardware executable models executed by a hardware-based emulator.

During each replay simulation of circuit behavior the virtual platform simulates circuit behavior by concurrently executing the high-level executable models and by using the workstation to execute one or more of the replay engines in lieu of executing their corresponding low-level executable models. Each executed replay engine simulates behavior of each output signal of a corresponding low-level module in response to the data recorded during the initial simulation representing the behavior of that output signal with delta cycle resolution.

The substitution of replay engines for their corresponding low-level executable models speeds replay simulations because a virtual platform can execute a replay engine much faster than its corresponding low-level executable model. The replay engines also reduce the need for limited low-level hardware and software simulation resources during replay simulations.

Since the replay engines are automatically generated when the high-level and low-level executable modules are compiled, there is no need to recompile the design prior to each replay simulation.

BRIEF DESCRIPTION OF THE DRAWINGS

A preferred embodiment of the present invention is illustrated by way of example, and not by way of limitation, in the figures of the accompanying drawings and in which like reference numerals refer to similar elements.

DETAILED DESCRIPTION OF THE INVENTION

Figure 1:
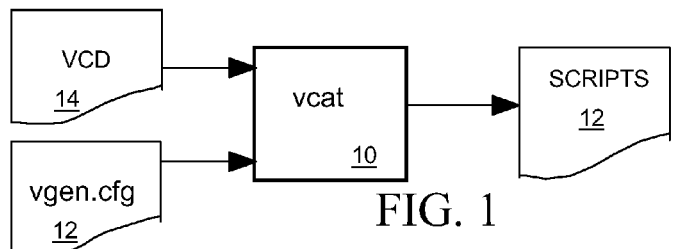
FIG. 1 is a process flow diagram depicting a prior art compiler for converting logic simulator configuration data and value change data into scripts.
Figure 2:
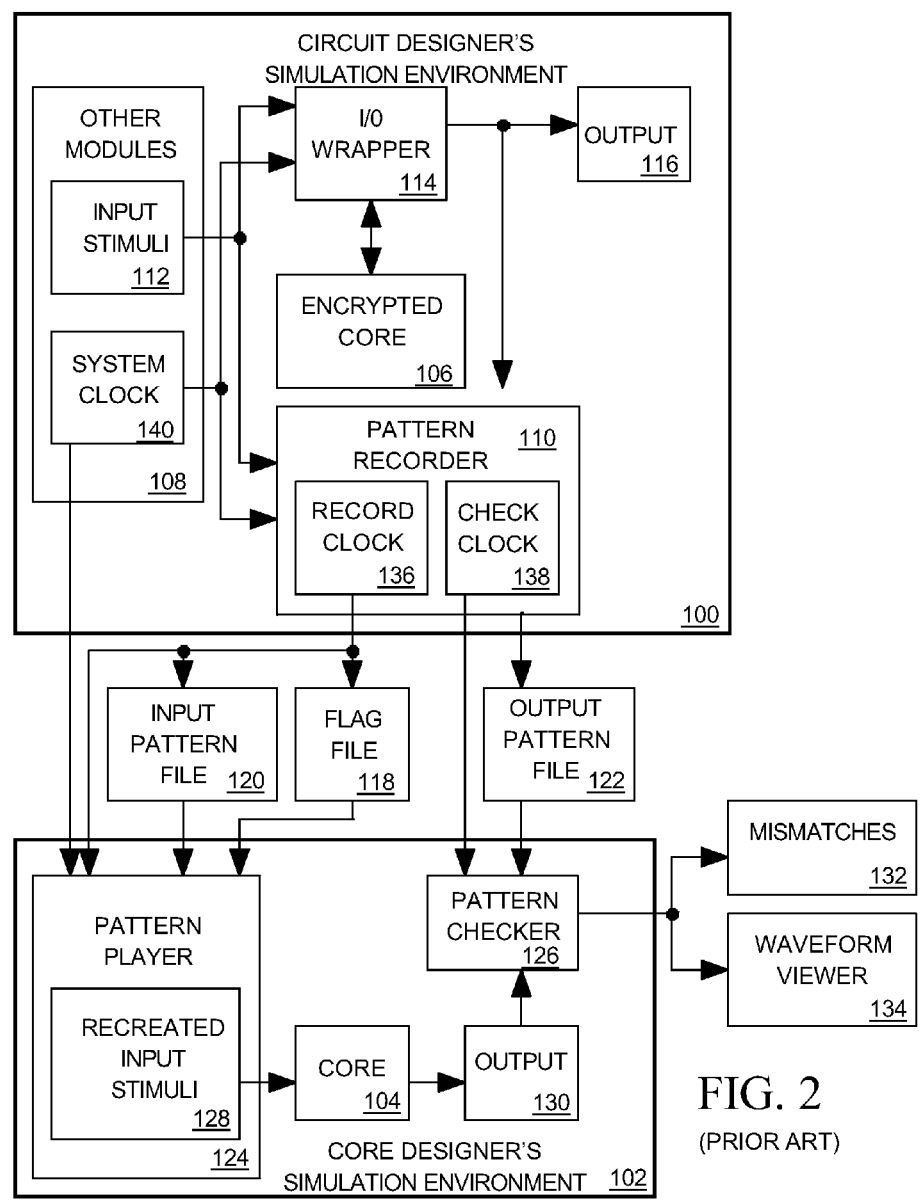
FIG. 2 is a process flow diagram illustrating a prior art system for simulating and re-simulating a circuit design including an encrypted core.

With the increasing complexity of System on a Chip (SoC) IC designs, IC designers nowadays build virtual platforms such as co-emulators and co-simulators to simulate the behavior of an SoC system at various levels of abstraction, to explore alternative system architectures, and to integrate hardware and software earlier in the design cycle. The invention relates to a method for reducing the time required for a virtual platform to re-simulate an IC design following an initial simulation. The method is suitably implemented by a simulation system including a workstation executing software residing on computer-readable media such as, for example, a hard disk, a compact disk, USB drive, or read only or random access memory, which when read and executed by the workstation, causes the simulation system to carry out the method. Although there are many possible modes of practicing the invention defined by the claims appended to this specification, the following specification and drawings describe in detail only one best mode of practicing the invention. Those of skill in the art will appreciate that not all implementation details described below are necessary to practice the invention as recited in the claims.

A typical digital IC includes a set of logic blocks and a set of registers or other clocked devices that synchronize state changes in signals passing between the logic blocks to edges of various clock signals. An IC designer usually organizes the logic blocks of an integrated circuit (IC) into a set of modules that communicate with each other. As the design process progresses, the IC design will model the modules at successively lower levels of abstraction. A "high-level' model written in a high-level verification language depicts a circuit module algorithmically at a functional level as a device that exchanges data with other models in the form of messages. A high-level model is an "untimed" or "approximate-timed" model in that it does not synchronize its processing of incoming messages and its production of outgoing messages to the IC's clock signals. A "low-level" model may employ a hardware description language (HDL) to depict a module as a device that receives and processes input signals to produce output signals. A low-level module is a "timed" model because it describes the model's actions as being synchronized to edges of clock signals. For example, a low-level HDL model may employ a register transfer level (RTL) language using Boolean expressions to describe logical relationships between input and output signals of the logic blocks that communicate through clocked registers within a module or may incorporate more detailed models of the behavior of logic gates and other circuit devices that implement those logic blocks.

At various points during the design process, an IC designer may program a virtual platform such as a co-simulator or co-emulator to simulate the behavior of the circuit described by the circuit design in response to a sequence of input signal states to determine whether an IC fabricated in accordance with the design will behave as expected. To do so, the designer compiles the design into a program for the virtual platform including executable models corresponding to the high-level and low-level circuit modules, a specification of the behavior of signals to be supplied as inputs to the circuit, and instructions for saving data representing behavior of selected circuit signals during the simulation, along with other instructions for controlling the virtual platform.

Each executable model can be either a software executable model (SWM) for configuring a computer-based logic simulator running on a workstation to simulate behavior of the corresponding circuit module, or a hardware executable model (HWM) for configuring a hardware-based emulator to simulate behavior of the corresponding circuit module. Each high-level design model and each low-level model can be compiled into a corresponding software model for execution by a computer-based logic simulator, but a low-level design model can alternatively be compiled into a hardware model for execution by an emulator. Since a hardware-based emulator can usually simulate behavior of a low-level design module faster than a computer-based logic simulator, it is often preferable to emulate rather than simulate all low-level modules when a co-verification system has sufficient emulation resources to do so.

Co-Simulation and Co-Emulation

Figure 3:
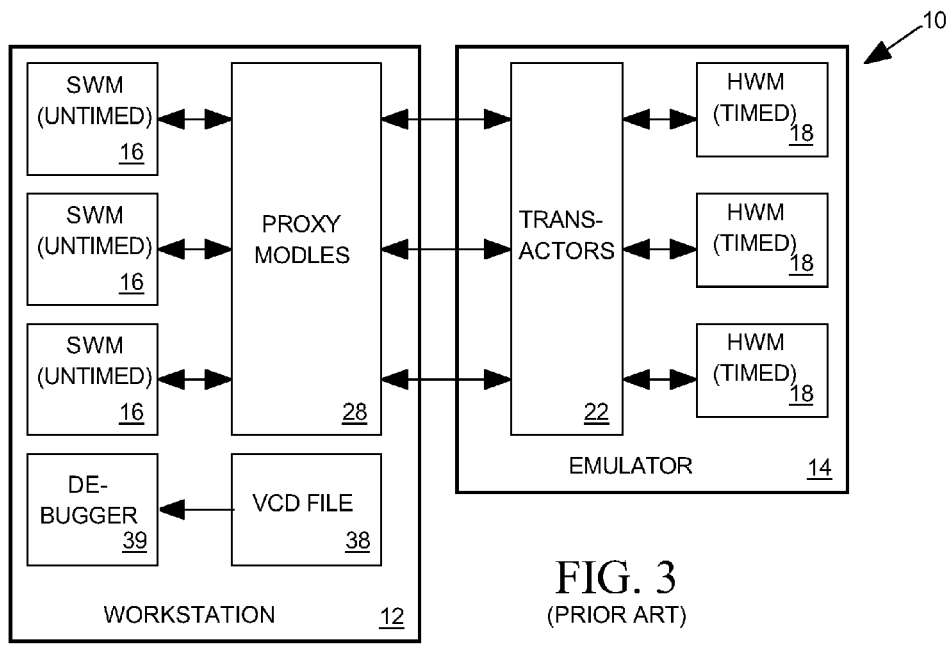
FIG. 3 is a hardware and software block diagram of a prior art co-emulation system.

A prior art "co-emulation system" 10, as depicted in FIG. 3, is a virtual platform that includes both a workstation 12 and an emulator 14 for concurrently executing software models (SWMs) 16 hardware models (HWMs) 18, with the workstation and the emulator transmitting messages to one another through a bus or network connection to indicate state changes in the input and output signals of the circuit design modules they simulate. Since actions of the low-level hardware models 18 are synchronized to clock signals, whereas the actions of the high-level software models 16 are not synchronized to clock signals, a set of proxy modules 28 implemented within workstation 12 and a set of "transactors" 22 within emulator 14 are provided to coordinate communications and the timing of actions between the software and hardware modules. Each proxy module 28 acts as a proxy for a separate hardware model 18 so that when any SWM 16 wants to change the state of an input signal of a module implemented by an HWM 18, the SWM 16 sends a message specifying the state change to proxy module 28, which then forwards a message to one of transactors 22 within emulator 14. That transactor 22 then changes the state of the appropriate physical input signal to the HWM 18, with the state change being synchronized to the appropriate clock signal edge. Conversely, when a hardware model 18 changes the state of an output signal representing an input of a module simulated by a software model 16, a transactor 22 sends a message to an appropriate proxy module 28, which then forwards a message to the appropriate SWM 16 informing it of the state change.

Figure 4:
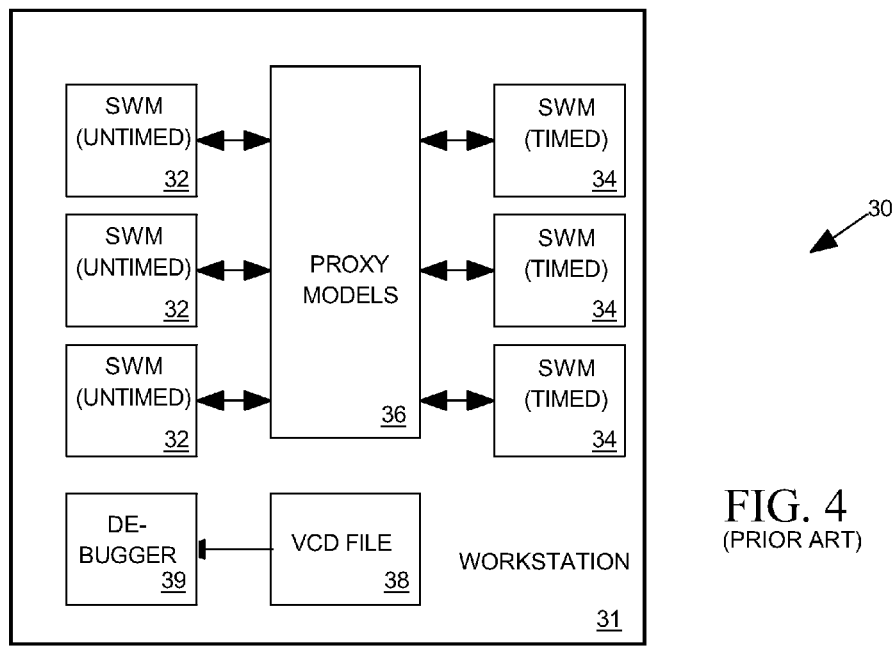
FIG. 4 is a software block diagram of a prior art co-simulation system.

As depicted in FIG. 4, a prior art "co-simulation" system 30 is a virtual platform employing only a workstation 31 running a simulation program to implement both high-level software models 32 and low-level software models 34 that communicate through proxy models 36. It is possible for a virtual platform to concurrently employ both co-simulation and co-emulation by using a workstation to simulate some low-level modules and by using an emulator to simulate other low-level modules.

The virtual platform saves data representing the state change behavior of selected circuit signals in a database called a "value change dump (VCD) file 38, normally residing on the workstation's hard drive. An IC designer can use a debugger 39 accessing the VCD file to investigate signal behavior to determine whether the simulated IC behaved as expected and to help locate the source of any errors. In an "interactive" debugging environment, the user can interactively halt and restart the simulation process at various points in order to debug the design during the simulation. In a "post-processing" debugging environment, debugger 39 access the data in VCD file 38 after the simulation process is complete.

Debugging Using Replay Simulations

Since it is normally too time-consuming a virtual platform to save data representing behavior of all circuit input to a hard disk, the IC designer usually programs the virtual platform to save data representing only a selected subset of those signals. For example, for an initial simulation, a designer may program a virtual platform to save data representing behavior of only the input and output signals of each module and to refrain from saving data representing the internal signals of any module. When a designer finds during debugging that the output signals of a particular simulated module do not behave as expected, the designer may want to view the behavior of the internal signals of that module. To do so, the designer can program the virtual platform to perform a "replay simulation" with the virtual platform configured to save data representing behavior of the internal signals of that particular module during the simulation process.

Many large pre-designed "legacy intellectual property (IP) modules" incorporated into IC designs as low-level models that require much processing time during simulation. Since creating a high-level model of such IP modules takes considerable effort, designers prefer to use the available slow-running low-level hardware or software models when simulating legacy IP modules on virtual platforms.

Figure 5:
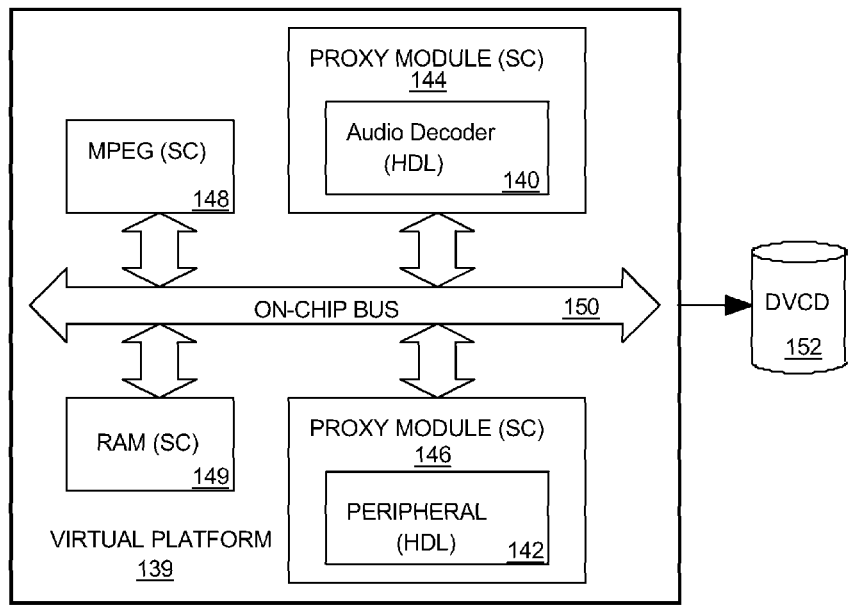
FIG. 5 is a block diagram of a virtual platform carrying out an initial simulation of an integrated circuit.

FIG. 5 shows an example virtual platform 139 for simulating an SoC IC wherein an audio decoder 140 and a peripheral device 142 communicating through proxy modules 144 and 146 are legacy IP modules modeled in HDL. The rest of the system modules, including MPEG 146 and RAM 149, and an on-chip bus 150 are modeled at higher, faster running abstraction levels, for example using SystemC (SC)—a system design and verification language, also known as Institute of Electrical and Electronics Engineering (IEEE) standard 1666. Circuit verification can be done either on a co-emulation or co-simulation system supporting SystemC-HDL co-simulation or co-emulation where the HDL models (140, 142) are executed either on a circuit emulator or as low-level software modules on a logic simulator. Although SystemC is used as the high-level modeling language in the context of this patent application, the invention is not limited to SystemC language. The described method can also be applied to a verification environment implemented in Hardware Verification Language, such as VERA or E.

Since legacy IP modules 140 and 142 are already verified by the IP module designer to operate properly, a user seeking to verify the behavior of the system of FIG. 5 will normally be interested in looking for bugs only in the SystemC modules 148, 149, and 150, often in an interactive debugging environment where values of local variables and stack traces can be examined and analyzed interactively, with the user inserting breakpoints in a simulation to cause the simulation to stop and allow debugging at points of interest.

A user may rerun a simulation many times in order to locate a bug, but since simulating the legacy IP modules 140 and 142 modeled in detailed HDL code is slow, each rerun can take a long time and require scarce resources such as a hardware execution engine. Since low-level modules require substantial simulation processing time, it is possible to speed up a replay simulation by replacing a slow-executing, low-level executable model of a module with a fast-executing, "replay engine" that mimics a module's behavior by generating the module's output signals based on data representing those signal's behavior that was recorded during the initial simulation. The present invention accordingly improves the speed and efficiency of debugging by replaying low-level legacy IP models with fast running "replay engines" during replay simulations.

Figure 6:
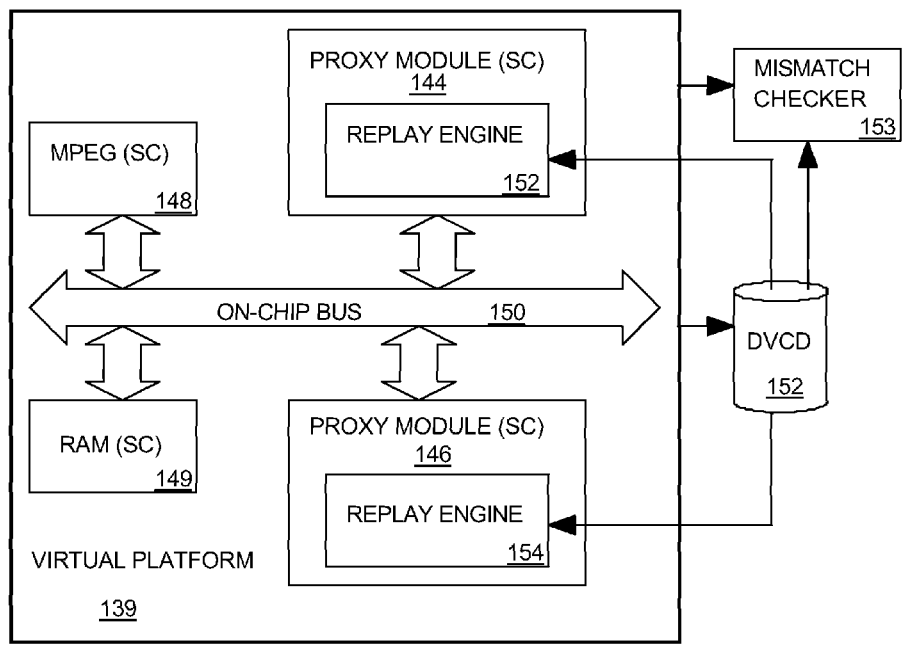
FIG. 6 is a block diagram of a virtual platform employing a method in accordance with the invention for carrying out a replay simulation of an integrated circuit in accordance with the invention.

As depicted in FIG. 6, during a replay simulation, virtual platform 139 employs a pair of fast running replay engines 152 and 154 replace the slow running, low-level HDL models of component IP audio decoder 140 and peripheral 142 used during the original simulation. Replay engines 152 and 154 derive their output signal behavior from the data recorded in a "delta cycle enhanced value change data" (DVCD) file 152 representing the output behavior of HDL modules 140 and 142 during the initial simulation. As discussed below, the data in DVCD file 152 represents signal behavior with delta cycle resolution. The replay simulator includes a mismatch checker 153 that compares behavior of various user-selected virtual platform signals during the replay simulation to the behavior of those signals during the original simulation, as indicated by the data in DVCD file 152 and provides the user with error messages when mismatches occur. A mismatch can occur when the user improperly selects a DVCD file for replay. The mismatch checker 153 is also useful when the user changes the design of one or more modules prior to a replay simulation and wants to determine whether the changed modules provide the same output signal behavior during the original and replay simulations.

Figure 7:
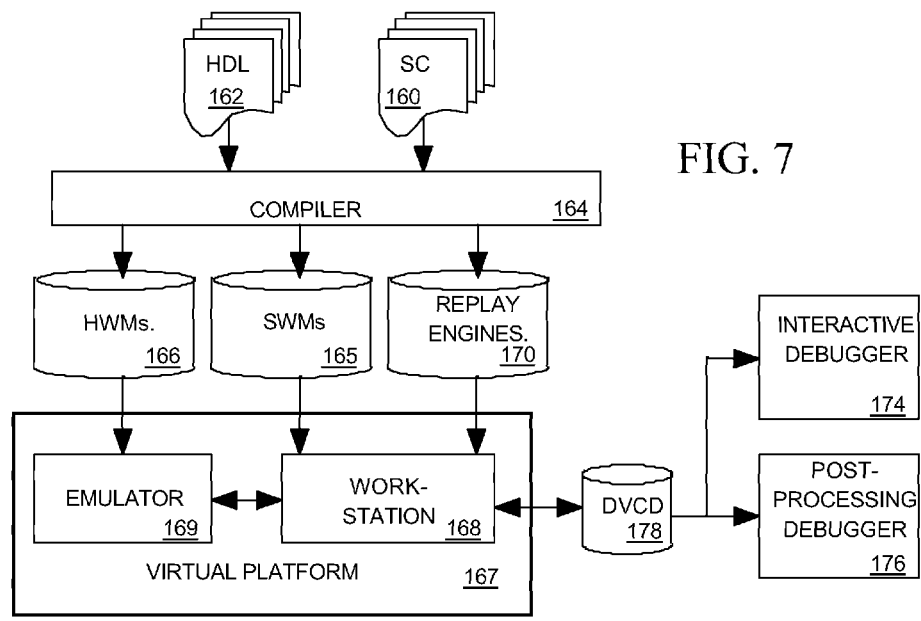
FIG. 7 is a data flow diagram illustrating a process for performing and debugging initial and replay simulations of an IC in accordance with the invention.

FIG. 7 is a simplified dataflow diagram depicting a method in accordance with the invention used in connection with a virtual platform 167. SystemC (SC) and HDL source files (160, 162) implementing both high-level and low-level design modules are initially input to a compiler 164, which generates software models (SWMs) 165 and/or hardware modules (HWM) 166 for configuring a logic simulator running on a workstation and/or an emulator 169 to simulate circuit behavior. Depending on the available emulation resources, compiler 164 will normally use emulator 169 to simulate low-level modeled portions of the circuit and will use workstation 186 to simulate all high-level modeled portions of the circuit, however when emulation resources are limited or non-existent, compiler 164 may provide low-level software models 165 to program workstation 168 to simulate some or all of the low-level design modules. During an initial simulation, virtual platform 167 generates a DVCD file 178 containing data indicating input and output signal value changes at the boundaries of all low-level HWM or SWM modeled modules as well as value changes in any other user-specified signals.

When it generates SWM and HWM models 165 and 166, compiler 164 also generates a set of executable replay engines 170 that can replace each slow, low-level HWM 166 and each low-level SWM 165 with a corresponding replay engine 170 that workstation 168 can execute during each replay simulation to model behavior of a corresponding circuit module. During any subsequent replay simulation in which a user wants virtual platform 167 to save DVCD data representing internal signal behavior of one or more modules of interest, virtual platform 167 replaces low-level HWM or SWM models of each other circuit module with its corresponding replay engine 170 for execution by workstation 168. Each replay engine 170 bases the state of the output signals of the module it simulates on the data previously saved in DVCD file 178, an operation that is much faster than generating output signal states by executing low-level HWM and/or SWM models 166 and 165 the replay engines 170 replace. A user can employ an interactive debugger 174 acquiring data from DVCD file 178 to debug the design at various stopping points during the replay simulation, or may use a post-processing debugger 176 to debug the replay results from the DVCD file 178 following the replay simulation.

Delta Cycle Enhanced Value Change Data

When simulating the behavior of a circuit, a conventional virtual platform increments simulated time in discrete steps and therefore produces data representing signal state changes as occurring only at discrete times. For example if the simulation time step size is 1 nsec, then the data will only show state changes as occurring at simulation times 1, 2, 3, etc., where simulation times are separated by 1 nsec intervals.

Figure 8A:
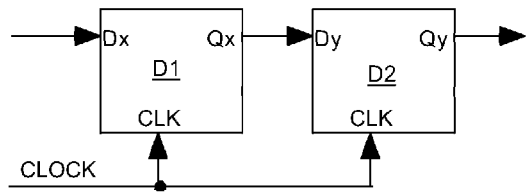
FIG. 8A is a block diagram illustrating two interconnected flip-flops.

FIG. 8A shows two D-type flip-flops D1 and D2 connected in series and clocked by leading edge of a CLOCK signal supplied to their CLK inputs. Thus whenever the CLOCK signal changes from state 0 to state 1, flip-flop D1 sets its Qx output to match the state of its Dx input and D2 sets its Qy output signal state to match the state of its Dy signal input.

FIG. 8A shows signal events occurring during an initial simulation of the flip-flop circuit. Suppose at simulation time 3, the logic simulator carries out the following operations in the following order:

1. Change the Qx output of flip-flop D1 to a 1 to match the current state of its D input (Dx)
2. Set the Dy input of flip-flop D2 to a 1 to match the current state of the Qx output of D2
3. Set the Qy output o flip-flop D2 to a 1 to match the current state of its Dy input.

Figure 8C:
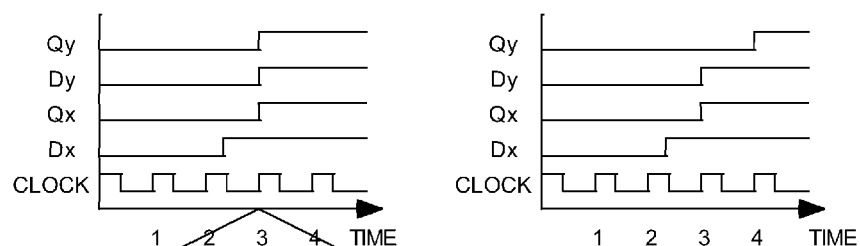
FIGS. 8B and 8C are timing diagram illustrating behavior of signals of FIG. 8A.
Figure 8B:

The result is shown in FIG. 8B. Suppose the logic simulator instead carries out the operations at simulation time 3 in the following order:
1. Change the Qx output of flip-flop D1 to a 1 to match the current state of its D input (Dx)
2. Set the Qy output of flip-flop D2 to a 0 to match the current state of its Dy input.
3. Set the Dy input of flip-flop D2 to a 1 to match the current state of the Qx output of D2, The result is shown in FIG. 8C. Note that in FIG. 8B, signal Qy changes state at time 3, but in FIG. 8C signal Qy changes state later, at time 4. Hence the order in which virtual platform 167 executes the models for various components at any given simulation time can affect signal states.

To avoid ambiguity in Qx and Dy at each simulation time, virtual platform 167 of FIG. 7 slices each simulation time step into a series of finer steps, called "delta cycles" as illustrated, for example in FIG. 8B, and assigns value changes to signals during different delta cycles. In the example of FIG. 8B, it executes the state change in Qx in delta cycle 2 of time step 3 and executes the state change in Qy during delta cycle 3.

Suppose flip-flop D1 is modeled by a replay engine 170 during a replay simulation. To guarantee identical results in the Qy output of flip-flop D2 when it is represented by a detailed model in the replay, the replay engine implementing flip-flop D1 must assign values to signal Qx in exactly the same delta cycle sequence as in the first simulation. Replay engine 170 therefore needs to be capable of replaying the simulation with delta cycle resolution to avoid mismatches in the states of signal Qy. Since each replay engine 170 must determine states of a module's output signals with delta cycle resolution based on the data stored in DVCD file 178, then in accordance with the invention, virtual platform 167 saves "delta cycle enhanced value change data" in DVCD file 178 representing state changes along module boundaries with delta cycle timing resolution so that the replay engines 170 can replay module output signal behavior with delta cycle timing resolution.

Replay Engine Algorithm

Figure 9:
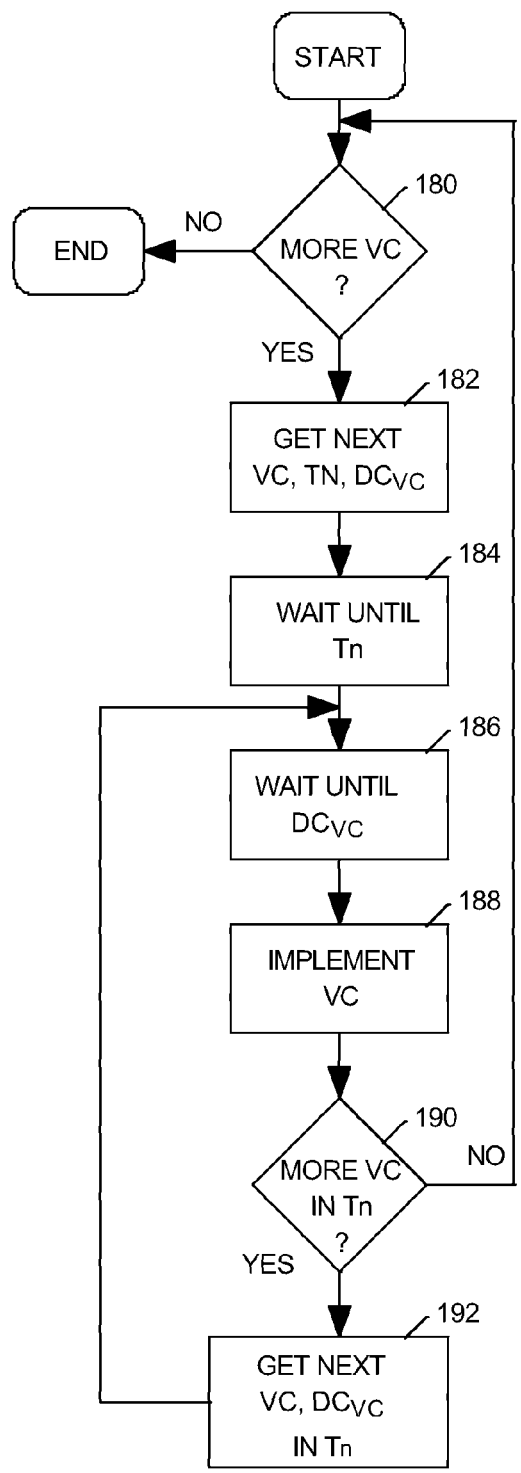
FIG. 9 is a flow chart illustrating a process carried out by a replay engine during a replay simulation.

FIG. 9 is a flowchart illustrating steps carried out by a replay engine 170 produced by compiler 164 of FIG. 7 for driving signal values at an output port or inout port. If there is a value change in any output that has not yet been executed (step 180) during a replay simulation, then at step 182, the replay engine acquires from DVCD file 178 of FIG. 7 the next value change (VC) that is to occur and the simulation time Tn and delta cycle DCVC in which the value change is to occur. The replay engine then waits until the simulation runs to the indicated simulation time Tn (step 184) and then further waits until the indicated delta cycle DCVC (step 186) of simulation time Tn. The replay engine then implements the value change (VC) by driving the value of the indicated output or inout signal to the indicated state (step 188). If another value change is to occur during simulation time Tn, the replay engine acquires from DVCD file 178 the next value change VC that is to occur, along with the delta cycle DCVC at which the value change is to occur (step 192) and then repeats steps 186-190. If there are no more value signal changes for the current simulation time Tn (step 190), but there is at least one value change to be implemented for at least one subsequent simulation time (step 180) the replay engine repeats steps 182-190 to implement all subsequent value change during the correct delta cycles of subsequent simulation times. The process ends when there are no remaining value changes for the replay engine to implement (step 180).

Replaying INOUT Port Behavior

Figure 10:
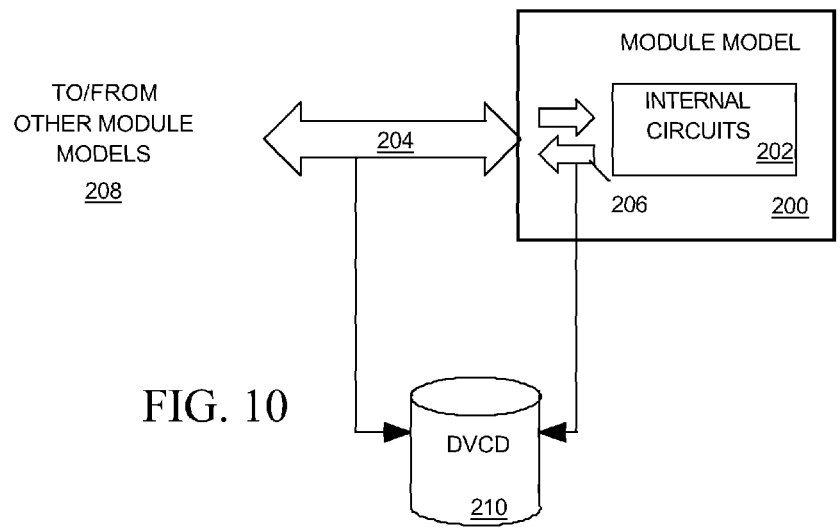
FIG. 10 is a data flow diagram showing an executable model of a module having an inout port and illustrating enhanced value change data stored during an initial simulation.
Figure 11:
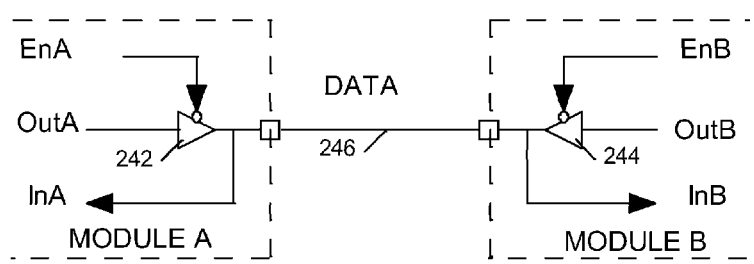
FIG. 11 is a schematic diagram showing of two modules communicating through bi-directional ports.

FIG. 10 illustrates a module model 200 which, in a co-emulation or co-simulation environment could be implemented by either a logic simulator or emulator during an initial simulation. Module 200 has a bi-directional inout port 204 that can be driven either by its internal circuits 202 via driving signal 206 or by other modules 208 accessing port 204. The state of inout port 204 at any time during the initial simulation may not always match the state of driving signal 206. For example, as illustrated in FIG. 11, two modules A and B communicate with each other via a bus 246. A tri-state buffer 242 or 244 in each module A or B couples the module's output driver signal OutA or OutB to a bi-directional bus 246 conveying a single bit DATA signal. Each module A or B controls the state of its respective tri-state buffer via an enable signal EnA or EnB When a module's enable signal EnA or EnB is asserted, its tri-state buffer output is driven to the value (a 1 or a 0) of the module's output driver signals OutA or OutB. When a module's enable signal EnA or EnB is de-asserted, the output of its tri-state buffer 242 or 244 is in a high-impedance state (Z). If module A is the driver and ModuleB is the load, EnA is asserted, EnB is de-asserted and DATA is driven to the value of OutA. Since buffer 244 is tri-stated, the value of OutB will not influence the value of DATA. ModuleB can therefore read the DATA value from the bus via its input signal InB. Conversely, if moduleB is the driver and ModuleA is the load, EnB is asserted, EnA is de-asserted and DATA is driven to the value of OutB. The value of OutA will not influence the value of DATA. ModuleA can therefore read the DATA value from the bus via its input signal InA.

Thus, referring again to FIG. 10, the state of the data bit on inout port 204 will match the state of driving signal 206 when module 200 is output enabled, but will match the state of the driving signal of one of the other modules 208 when that other module is output enable. If, during a replay simulation, the recorded module driving signal value 206 is used to drive inout port 204, the state of inout port 204 during the replay may not always match the state of the inout port during the initial simulation. Thus during a replay simulation, the replay engine simulating the module uses the state of the internal driving signal 206 recorded in DVCD file 210 during the initial simulation to driving signal 206, but uses the state of port 204, also recorded in database 210 during the initial simulation, to check for mismatches during the replay simulation.

Figure 12:
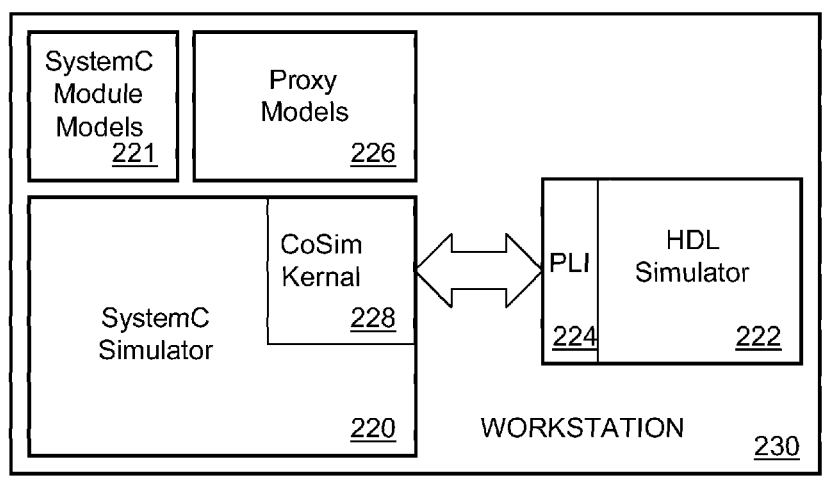
FIG. 12 is a software block diagram of workstation implementing a co-simulation virtual platform.

FIG. 12 depicts a SystemC-HDL co-simulation environment in accordance with the invention wherein a SystemC simulator 220, simulating SystemC modules 221, communicates with an HDL logic simulator 222 via a Programming Language Interface (PLI) 224, with a SystemC proxy module 226 acting as a proxy of the HDL module simulated on the HDL logic simulator PLI 224 provides interfaces for driving signal inputs to HDL logic simulator 222 and for receiving notification of value changes in signals of interest. Logic simulators 220 and 222 may run on the same workstation 230 as shown in FIG. 12 or on separate workstations interconnected to communicate with one another. With PLI 224 communication between the CoSim kernel 228 and HDL logic simulator 222, value changes of boundary signals resulting from SystemC simulation can be synchronized to HDL logic simulator 222, and vice versa. For an inout port, the value changes resulting from HDL logic simulator 222 are recorded in a DVCD file for later replay. The recording can be performed on the SystemC side without the need of modifying HDL logic simulator 222. However, modification of a SystemC logic simulator is required to create such a co-simulation environment. Thus replaying an inout port is much like replaying an input port and an output port, where the input port is compared with the recorded value of the inout port (i.e. resolved values), and the output port is replayed according to the recorded values driven from the HDL logic simulator.

Thus has been shown and described a method in accordance with the invention for simulating and re-simulating behavior of a circuit. While a preferred embodiment of the invention has been shown and described above, those of skill in the art will appreciate that the invention may be practiced in a variety of ways and that not all details of the preferred embodiment are essential to practicing the invention. The claims appended to this specification define true scope of the invention.

What is claimed is:

1. A method for simulating and re-simulating behavior of a circuit comprising at least one high-level circuit module and at least one low-level circuit module, wherein each high-level circuit module is represented by a high-level design model and each low-level circuit module is represented by a low-level design model, wherein the low-level circuit module has a plurality of output driving port signals capable of outputting data from the low-level circuit module and a plurality of input receiving port signals capable of inputting data to the low-level circuit module, the method comprising the steps of:
   a. compiling each high-level design model into a corresponding high-level executable model for simulating behavior of the at least one high-level circuit module and compiling each low-level design model into a corresponding low-level executable model for simulating behavior of the at least one low-level circuit module;
   b. generating a first replay engine for a first low-level circuit module of the at least one low-level circuit module according to the output driving port signals of the first low-level circuit module, wherein the first replay engine for the first low-level circuit module is generated without using any simulated data and without using any emulated data;
   c. performing an initial simulation of circuit behavior, comprising executing the high-level executable models and the low-level executable models and recording data representing behavior of the output driving port signals of the first low-level circuit module in response to the input receiving port signals of the first low-level circuit module; and
   d. performing a replay simulation of circuit behavior, comprising executing the high-level executable models, the first replay engine to replace the low-level executable model corresponding to the first low-level circuit module, and the low-level executable models which are not replaced, wherein the first replay engine simulates behavior of the output driving port signals of the first low-level circuit module in response to the data recorded during the initial simulation that represents the behavior of the output driving port signals of the first low-level circuit module.

2. The method in accordance with claim 1, wherein one of the output driving port signals is an output signal to output data from the first low-level circuit module; the data recorded in step c includes data that represents behavior of the output signal; and the replay simulation of step d includes simulating behavior of the output signal in response to data recorded during the initial simulation that represents the behavior of the output signal.

3. The method in accordance with claim 1, wherein one of the output driving port signals is an inout signal with associated internal signals for conditioning the inout signal to output data from the first low-level circuit module; the data recorded in step c includes data that represents behavior of the associated internal signals; and the replay simulation of step d includes simulating behavior of the inout signal in response to the behavior of the associated internal signals recorded during the initial simulation that represents the behavior of the associated internal signals.

4. The method in accordance with claim 1, wherein each of the input receiving port signals capable of inputting data to the first low-level circuit module is from an input port or inout port of the first low-level circuit module.

5. The method in accordance with claim 1, wherein step b further comprises generating a second replay engine for a second low-level circuit module of the at least one low-level circuit module according to the output driving port signals of the second low-level circuit module; step c further comprises recording data representing behavior of the output driving port signals of the second low-level circuit module in response to the input receiving port signals capable of inputting data to the second low-level circuit module; and step d further comprises executing the second replay engine to replace the low-level executable model corresponding to the second low-level circuit module, wherein the second replay engine simulates behavior of the output driving port signals of the second low-level circuit module in response to the data recorded during the initial simulation that represents the behavior of the output driving port signals.

6. The method in accordance with claim 1, wherein the at least one low-level circuit module includes a second low-level circuit module and the replay simulation in step d further comprises recording data representing behavior of internal signals of the second low-level circuit module.

7. The method in accordance with claim 1, wherein the initial and replay simulations are performed on a co-emulation virtual platform including a workstation executing the high-level executable models and the first replay engine and an emulator for the low-level executable models which are not replaced.

8. The method in accordance with claim 1, further comprising the step of:
   e. interactively debugging the replay simulation by temporarily halting the replay simulation, processing the recorded data and then continuing the replay simulation.

9. The method in accordance with claim 1, further comprising the step of:
   e. post-process debugging the replay simulation by processing the recorded data following the replay simulation.

10. The method in accordance with claim 1, wherein the data is recorded with delta cycle resolution during the initial simulation and the first replay engine simulates behavior of each output signal of the first low-level circuit module with delta cycle resolution during the replay simulation.

11. The method in accordance with claim 1, wherein step c further comprises recording data that represents behavior of at least one selected signal of the circuit other than the output driving port signals of the first low-level circuit module, the method further comprising the step of:
   e. comparing simulated behavior of the at least one selected signal of the circuit during the initial simulation as indicated by the recorded data to simulated behavior of the at least one selected signal during the replay simulation to determine whether there is any mismatch in simulated behavior.

12. A non-transitory computer-readable media containing software, which when read and executed by a simulation system, causes the simulation system to carry out a method for simulating and re-simulating behavior of a circuit comprising at least one high-level circuit module and at least one low-level circuit module, wherein each high-level circuit module is represented by a high-level design model and each low-level circuit module is represented by a low-level design model, wherein the low-level circuit module has a plurality of output driving port signals capable of outputting data from the low-level circuit module and a plurality of input receiving port signals capable of inputting data to the low-level circuit module, the method comprising the steps of:
    a. compiling each high-level design model into a corresponding high-level executable model for simulating behavior of the at least one high-level circuit module and compiling each low-level design model into a corresponding low-level executable model for simulating behavior of the at least one low-level circuit module;
    b. generating a first replay engine for a first low-level circuit module of the at least one low-level circuit module according to the output driving port signals of the first low-level circuit module, wherein the first replay engine for the first low-level circuit module is generated without using any simulated data and without using any emulated data;
    c. performing an initial simulation of circuit behavior, comprising executing the high-level executable models and the low-level executable models and recording data representing behavior of the output driving port signals of the first low-level circuit module in response to the input receiving port signals of the first low-level circuit module; and
    d. performing a replay simulation of circuit behavior, comprising executing the high-level executable models, the first replay engine to replace the low-level executable model corresponding to the first low-level circuit module, and the low-level executable models which are not replaced, wherein the first replay engine simulates behavior of the output driving port signals of the first low-level circuit module in response to the data recorded during the initial simulation that represents the behavior of the output driving port signals of the first low-level circuit module.

13. The non-transitory computer-readable media in accordance with claim 12, wherein one of the output driving port signals is an output signal to output data from the first low-level circuit module; the data recorded in step c includes data that represents behavior of the output signal; and the replay simulation of step d includes simulating behavior of the output signal in response to data recorded during the initial simulation that represents the behavior of the output signal.

14. The non-transitory computer-readable media in accordance with claim 12, wherein one of the output driving port signals is an inout signal with associated internal signals for conditioning the inout signal to output data from the first low-level circuit module; the data recorded in step c includes data that represents behavior of the associated internal signals; and the replay simulation of step d includes simulating behavior of the inout signal in response to the behavior of the associated internal signals recorded during the initial simulation that represents the behavior of the associated internal signals.

15. The non-transitory computer-readable media in accordance with claim 12, wherein step b further comprises generating a second replay engine for a second low-level circuit module of the at least one low-level circuit module according to the output driving port signals of the second low-level circuit module; step c further comprises recording data representing behavior of the output driving port signals of the second low-level circuit module in response to the input receiving port signals capable of inputting data to the second low-level circuit module; and step d further comprises executing the second replay engine to replace the low-level executable model corresponding to the second low-level circuit module, wherein the second replay engine simulates behavior of the output driving port signals of the second low-level circuit module in response to the data recorded during the initial simulation that represents the behavior of the output driving port signals.

16. The non-transitory computer-readable media in accordance with claim 12, wherein the at least one low-level circuit module includes a second low-level circuit module and the replay simulation in step d further comprises recording data representing behavior of internal signals of the second low-level circuit module.

17. The non-transitory computer-readable media in accordance with claim 12, wherein the initial and replay simulations are performed on a co-emulation virtual platform including a workstation executing the high-level executable models and the first replay engine and an emulator for the low-level executable models which are not replaced.

18. The non-transitory computer-readable media in accordance with claim 12, further comprising the step of:
    e. interactively debugging the replay simulation by temporarily halting the replay simulation, processing the recorded data and then continuing the replay simulation.

19. The non-transitory computer-readable media in accordance with claim 12, further comprising the step of:
    e. post-process debugging the replay simulation by processing the recorded data following the replay simulation.

20. The non-transitory computer-readable media in accordance with claim 12, wherein the data is recorded with delta cycle resolution during the initial simulation and the first replay engine simulates behavior of each output signal of the first low-level circuit module with delta cycle resolution during the replay simulation.

* * * * *